United States Patent
Ahn et al.

(10) Patent No.: US 12,282,273 B2
(45) Date of Patent: Apr. 22, 2025

(54) DEVELOPMENT DEVICE HAVING ROTATABLE WIPER WIPING OPTICAL SURFACE OF LENS

(71) Applicant: Hewlett-Packard Development Company, L.P., Spring, TX (US)

(72) Inventors: Yongnam Ahn, Seongnam-si (KR); Jongin Kim, Seongnam-si (KR); Woongyong Choi, Seongnam-si (KR); Shinhyup Kang, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/556,028

(22) PCT Filed: Aug. 31, 2021

(86) PCT No.: PCT/US2021/071315
§ 371 (c)(1),
(2) Date: Oct. 18, 2023

(87) PCT Pub. No.: WO2022/235306
PCT Pub. Date: Nov. 10, 2022

(65) Prior Publication Data
US 2024/0201617 A1   Jun. 20, 2024

(30) Foreign Application Priority Data
May 4, 2021   (KR) .................. 10-2021-0058098

(51) Int. Cl.
*G03G 15/08*   (2006.01)

(52) U.S. Cl.
CPC ...... *G03G 15/0896* (2013.01); *G03G 15/0862* (2013.01); *G03G 15/0889* (2013.01); *G03G 2215/0891* (2013.01)

(58) Field of Classification Search
CPC .......... G03G 15/0862; G03G 15/0889; G03G 15/0896
See application file for complete search history.

(56) References Cited

U.S. PATENT DOCUMENTS

| | | |
|---|---|---|
| 5,682,574 A | 10/1997 | Oshida et al. |
| 8,643,690 B2 | 2/2014 | Takagi |
| 2009/0214230 A1 | 8/2009 | Kweon et al. |
| 2014/0079415 A1* | 3/2014 | Fukasawa .......... G03G 15/0865 399/254 |
| 2017/0010577 A1 | 1/2017 | Maehara |

FOREIGN PATENT DOCUMENTS

| | | |
|---|---|---|
| JP | 06-308832 A | 11/1994 |
| JP | 07-295361 A | 11/1995 |
| JP | 2019-159055 A | 9/2019 |
| WO | 2008/035750 A1 | 3/2008 |

* cited by examiner

*Primary Examiner* — Hoang X Ngo
(74) *Attorney, Agent, or Firm* — Foley & Lardner LLP

(57) ABSTRACT

A developing device includes a housing to accommodate toner, a rotation member installed in the housing, a lens including an optical surface oriented in an axial direction of the rotation member, and a wiper installed in the rotation member and configured to repeatedly wipe the optical surface while the rotation member rotates and supported by the rotation member so as to be movable in the axial direction.

15 Claims, 12 Drawing Sheets

DEVELOPMENT DEVICE HAVING ROTATABLE WIPER WIPING OPTICAL SURFACE OF LENS

CROSS-REFERENCE TO RELATED APPLICATIONS

This application is a U.S. National Stage Patent Application under 35 U.S.C. § 371 of PCT/US2021/071315, filed Aug. 31, 2021, which claims priority to Korean Patent Application No. 10-2021-0058098, filed May 4, 2021, which are hereby incorporated by reference in their entireties.

BACKGROUND

An electrophotographic image forming device irradiates a photoconductor with modulated light corresponding to image information to form an electrostatic latent image on a surface of the photoconductor, supplies toner to the electrostatic latent image to develop the electrostatic latent image into a visible image, and transfers and fuses the developed image on a printing medium to print the image on the printing medium.

A developing (development) device supplies toner to the electrostatic latent image to develop the electrostatic latent image into a visible toner image. Toner is accommodated in the developing device. A remaining toner level sensor detects a remaining toner level in the developing device. In a case where the remaining toner level in the developing device is less than a certain reference remaining level as a result of detection of the remaining toner level sensor, a new developing device may be installed or toner in the developing device may be replenished.

DETAILED DESCRIPTION

Figure 1:
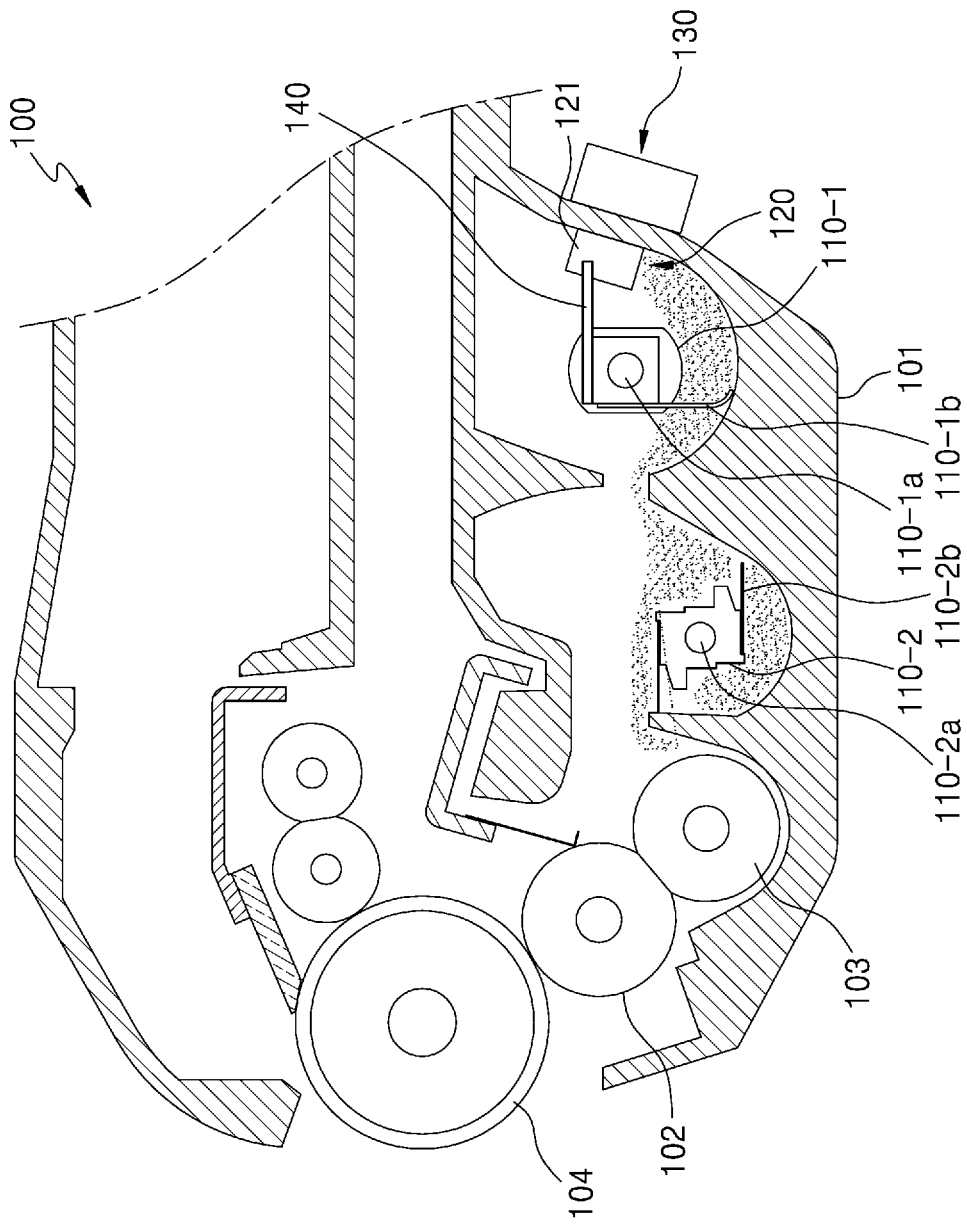
FIG. 1 is a schematic cross-sectional view of a developing device, according to an example.

An image forming device supplies toner using a developing device to an electrostatic latent image formed on a photoconductor, and develops the electrostatic latent image into a visible toner image. The toner image is transferred to a printing medium and fused as a permanent image by a fusing device. In a case where the toner accommodated in the developing device is all consumed, the developing device may be replaced with a new developing device, or toner may be supplied to the developing device from an internal or external toner cartridge. A remaining toner level sensor detects a remaining toner level in the developing device. A lens having an optical surface provides an optical path between the remaining toner level sensor and the inside of the developing device. Since the optical surface is located in the developing device, the optical surface may be contaminated by the toner. The optical surface is cleaned by a cleaning member. The cleaning member is brought into frictional contact with the optical surface to remove foreign matters such as toner adhering to the optical surface. An amount of overlap between the cleaning member and the optical surface of the lens may vary depending on manufacturing tolerances of the lens and the cleaning member, and assembly errors of the lens and the cleaning member, and the like. If the amount of overlap is too little, contamination of the optical surface of the lens may not be properly removed. On the other hand, if the amount of overlap is too great, the toner may adhere to the optical surface due to an excessive friction between the cleaning member and the optical surface, or physical properties of the toner may deteriorate, thereby affecting a printed image.

The developing device (development device) according to the present example includes a housing to accommodate toner, a rotation member installed in the housing, a lens including an optical surface facing an axial direction of the rotation member, and a wiper installed in the rotation member and configured to periodically wipe the optical surface while the rotation member rotates, and the wiper is supported by the rotation member so as to be movable in the axial direction. Since the wiper has a degree of freedom in the axial direction, variations in an amount of overlap due to manufacturing tolerances of the wiper and the lens and assembly errors of the wiper, the lens, and the developing device may be corrected by a movement of the wiper in the axial direction. The wiper may be supported by the rotation member so as to be tiltable in the axial direction of the rotation member. The rotation member may be a stirring member configured to supply toner to a developing roller. The optical surface of the lens may include a light emission surface and a light reception surface facing each other in the axial direction of the rotation member, and the wiper may include first and second wiping portions configured to wipe the light emission surface and the light reception surface, respectively. The first and second wiping portions may have diagonal shapes symmetrical to each other. Hereinafter, examples of the developing device will be described with reference to the accompanying drawings.

An electrophotographic image forming device forms an electrostatic latent image on a photoconductor and supplies toner to the electrostatic latent image to develop the electrostatic latent image into a visible toner image. The electrophotographic image forming device includes a developing device configured to supply toner accommodated therein to the electrostatic latent image. FIG. 1 is a schematic cross-sectional view of a developing device 100, according to an example. Referring to FIG. 1, the developing device may include a housing 101 in which toner is accommodated, a rotation member 110-1 installed in the housing 101, a lens 120 including an optical surface 121 facing an axial direction of the rotation member 110-1, and a wiper 140 installed in the rotation member 110-1 and configured to periodically wipe the optical surface 121 while the rotation member 110-1 rotates, and the wiper 140 is supported by the rotation member 110-1 so as to be movable in the axial direction. As the rotation member 110-1 rotates, the wiper 140 repeatedly wipes the optical surface 121 of the lens 120.

Toner is accommodated in the housing 101. A developing roller 102 is supported on the housing 101 so as to be rotatable. The developing roller 102 supplies toner in the housing 101 to an electrostatic latent image formed on a photosensitive drum (photoconductor) 104. One or more rotation members 110-1 and 110-2 may be installed in the housing 101. The rotation members 110-1 and 110-2 may be stirring members configured to stir the toner in the housing 101 and convey the toner to the developing roller 102. For example, the rotation member 110-1 may include a rotation shaft 110-1*a* and a stirring blade 110-1*b* extending in a radial direction from the rotation shaft 110-1*a*. While the rotation member 110-1 rotates, the stirring blade 110-1*b* conveys the toner in the housing 101 to the developing roller 102. The rotation member 110-2 may include a rotation shaft 110-2*a* and a stirring blade 110-2*b* extending in a radial direction from the rotation shaft 110-2*a*. While the rotation member 110-2 rotates, the stirring blade 110-2*b* conveys the toner conveyed by the rotation member 110-1 to the developing roller 102. Reference numeral 103 denotes a supply roller configured to supply toner to an outer circumference of the developing roller 102.

In a case where a remaining toner level in a developing device 100 is less than or equal to a certain reference remaining level, the developing device 100 may be replaced with a new developing device, or toner may be supplied to the developing device 100. Supply of toner to the developing device 100 may be performed by mounting a toner cartridge (not shown) onto the developing device 100, directly supplying the toner from the toner cartridge into the housing 101, and then removing the toner cartridge. Alternatively, the supply of toner to the developing device 100 may be performed by mounting the toner cartridge (not shown) onto the developing device 100, filling a toner reception portion (not shown), and supplying toner from the toner reception portion to the housing 101. To that end, a structure configured to detect a remaining toner level in the developing device 100 is employed.

Figure 2:
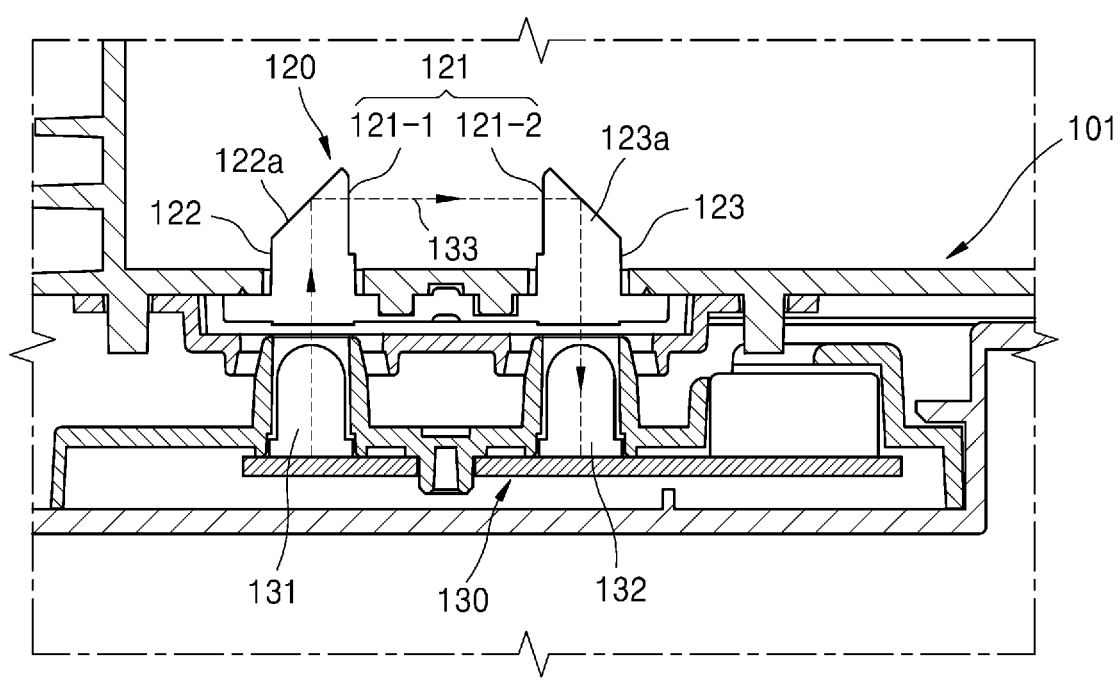
FIG. 2 illustrates a structure configured to detect a remaining toner level, according to an example.

FIG. 2 illustrates a structure configured to detect a remaining toner level, according to an example. Referring to FIGS. 1 and 2, the developing device 100 may include a remaining toner level sensor 130. The remaining toner level sensor 130 may detect a remaining level of toner in the housing 101 using a photo-detection method. The remaining toner level sensor 130 irradiates light into the housing 101 and receives light passing through the housing 101. The remaining toner level sensor 130 detects the remaining level of toner in the housing 101 based on an amount of received light. The remaining toner level sensor 130 may include a light emission portion 131 and a light reception portion 132. In order to avoid contamination of the light emission portion 131 and the light reception portion 132 by the toner, the remaining toner level sensor 130 may be located outside the housing 101.

The lens 120 is partially located in the housing 101, and provides an optical path between the inside of the housing 101 and the remaining toner level sensor 130. Light 133 emitted from the light emission portion 131 passes through the housing 101 along the optical path provided by the lens 120 and is incident on the light reception portion 132. The lens 120 may include the optical surface 121 configured to irradiate light into the housing 101 and receive the light passing through the housing 101. The optical surface 121 may include, for example, a light emission surface 121-1 configured to irradiate light into the housing 101 and a light reception surface 121-2, which faces the light emission surface 121-1 in an axial direction and, on which the light passing through the housing 101 is incident. The light emission surface 121-1 and the light reception surface 121-2 are arranged apart from each other. An amount of light incident on the light reception surface 121-2 varies depending on an amount of toner between the light emission surface 121-1 and the light reception surface 121-2.

The lens 120 may guide light irradiated from the light emission portion 131 to be incident on the light reception portion 132, where the light passes through the light emission surface 121-1 and the light reception surface 121-2. For example, the lens 120 may include first and second light guide portions 122 and 123. The first light guide portion 122 guides the light 133 emitted from the light emission portion 131 into the housing 101. The second light guide portion 123 guides the light 133 passing through the housing 101 to the light reception portion 132. The first and second light guide portions 122 and 123 may include first and second light path changing portions 122*a* and 123*a*, respectively. The first light path changing portion 122*a* reflects the light 133 emitted from the light emission portion 131 toward the light reception surface 121-2 and the second light path changing portion 123*a* via the light emission surface 121-1. The second light path changing portion 123*a* reflects the light 133 passing through the light reception surface 121-2 toward the light reception portion 132. The first and second light guide portions 122 and 123 may be formed of a translucent material through which the light 133 may pass. The first and second light path changing portions 122*a* and 123*a* may be implemented by, for example, an inclined surface having a certain inclination angle. The inclination angle of the inclined surface may be, for example, an angle that meets a condition of total reflection. Given the above configuration, since an amount of light detected by the light reception portion 132 varies depending on a remaining level of toner in the housing 101, the remaining level of toner in the housing 101 may be detected based on an amount of light received by the light reception portion 132.

The optical surface 121 of the lens 120, that is, the light emission surface 121-1 and the light reception surface 121-2 facing each other, is in contact with the toner in the housing 101. If the light emission surface 121-1 and the light reception surface 121-2 are contaminated by the toner, it may be difficult to accurately detect the remaining level of toner. Referring to FIG. 1, the wiper 140 configured to wipe the light emission surface 121-1 and the light reception surface 121-2 is provided within the housing 101. The wiper 140 may include a blade sheet made of a flexible material such as urethane, for example. The wiper 140 periodically wipes the light emission surface 121-1 and the light reception surface 121-2 to remove foreign matters such as toner adhering to the light emission surface 121-1 and the light reception surface 121-2. According to an example, the wiper 140 may be installed in the rotation member 110-1 to periodically wipe the light emission surface 121-1 and the light reception surface 121-2 while rotating together with the rotation member 110-1. In order to avoid interference from the stirring blade 110-1*b* of the rotation member 110-1, the lens 120 may be located outside a stirring area in which the stirring blade 110-1*b* is installed in an axial direction of the rotation member 110-1.

Figure 3:
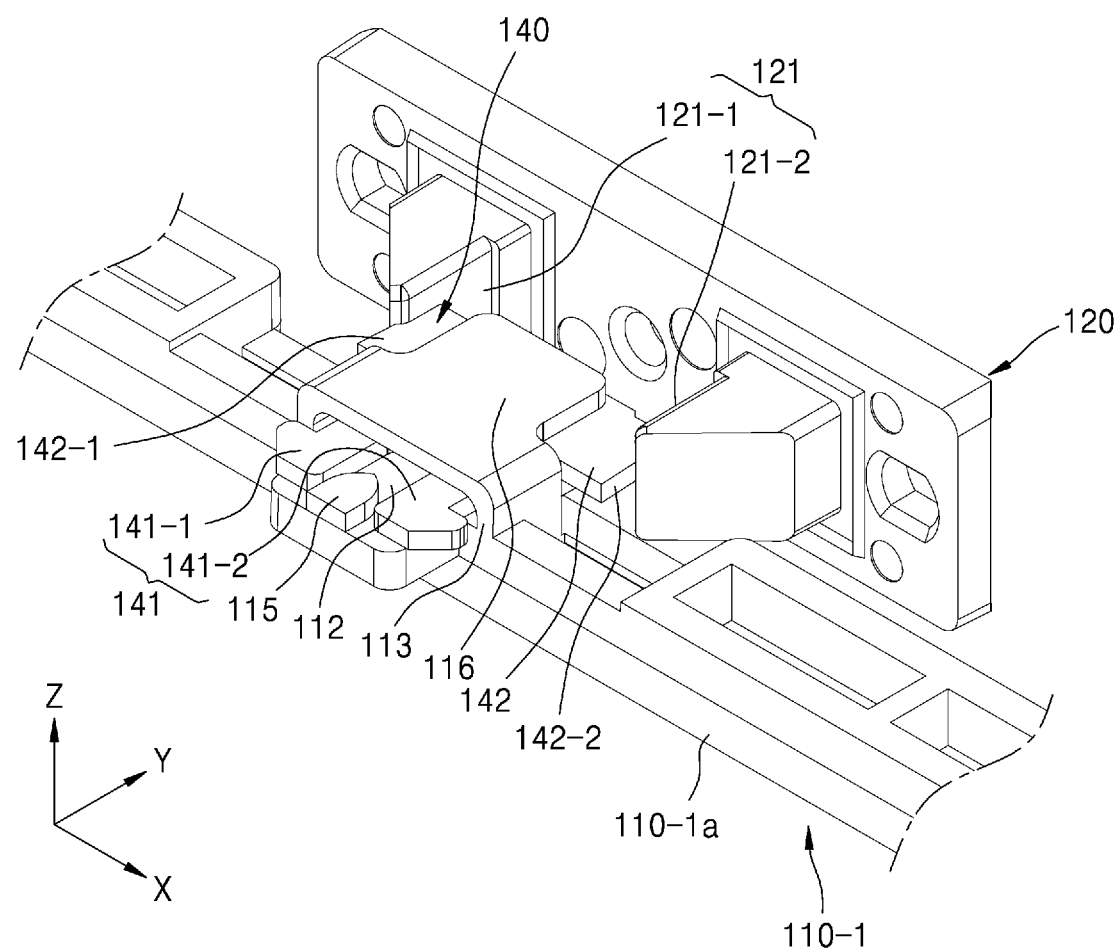
FIG. 3 is a perspective view illustrating an installation structure of a wiper, according to an example.
Figure 4:
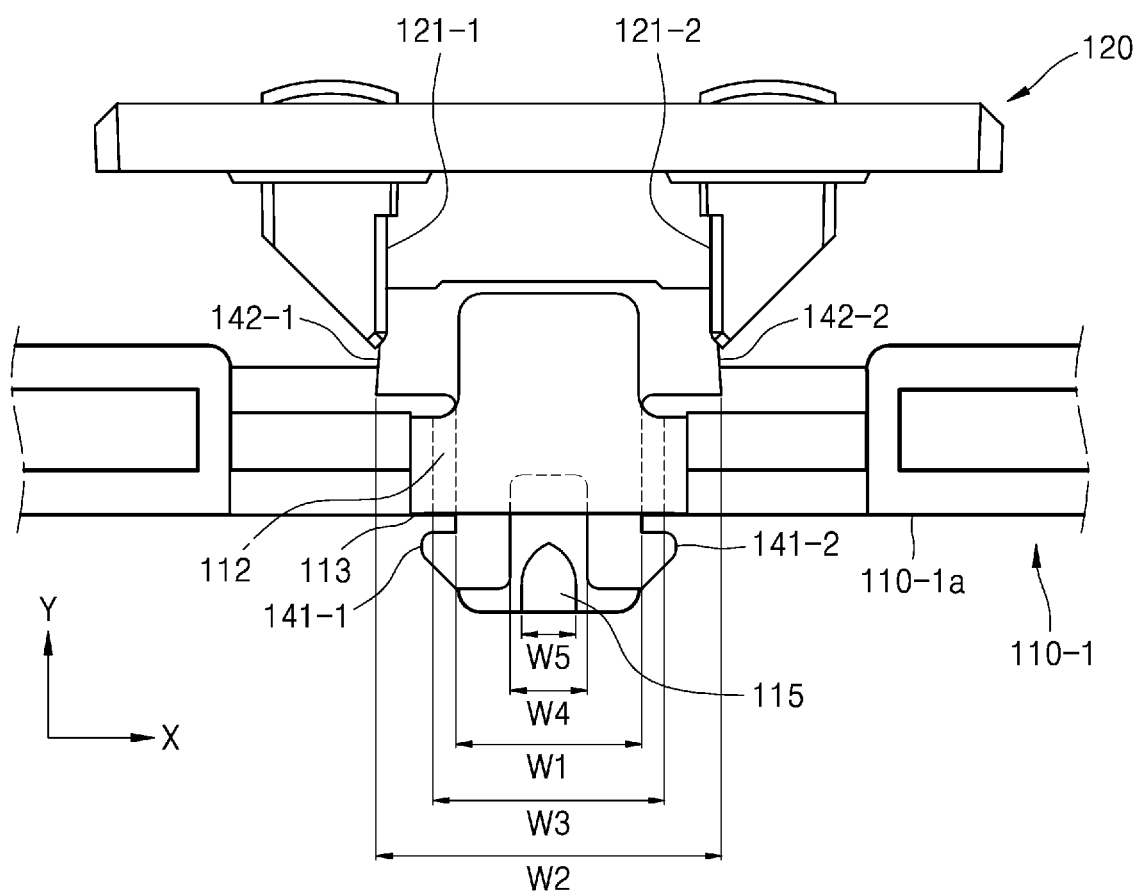
FIG. 4 is a plan view of the installation structure of the wiper illustrated in FIG. 3, according to an example.

FIG. 3 is a perspective view illustrating an installation structure of the wiper 140, according to an example, and FIG. 4 is a plan view of the installation structure of the wiper 140 illustrated in FIG. 3, according to an example. Referring to FIGS. 3 and 4, the optical surface 121 of the lens 120, that is, the light emission surface 121-1 and the light reception surface 121-2, face along an axial direction X of the rotation member 110-1. The light emission surface 121-1 and the light reception surface 121-2 are arranged apart from each other in the axial direction X. The wiper 140 may include a support 141 and a wiping portion 142. The support 141 is supported by the rotation member 110-1. The support 141 may include a pair of elastic hooks 141-1 and 141-2. The support 141 has a first width W1 in the axial direction X. The elastic hooks 141-1 and 141-2 of the support 141 are arranged apart from each other in the axial direction X. The wiping portion 142 extends from the support 141 toward the optical surface 121 in the Y direction that is orthogonal to the axial direction X. The wiping portion 142 has a second width W2. The second width W2 is greater than the first width W1. The wiping portion 142 includes first and second wiping portions 142-1 and 142-2 configured to wipe the light emission surface 121-1 and the light reception surface 121-2, respectively. The first and second wiping portions 142-1 and 142-2 overlap the light emission surface 121-1 and the light reception surface 121-2, respectively. An amount of overlap affects the wiping performance. A manufacturing error of the rotation member 110-1, a manufacturing error of the wiper 140, a manufacturing error of the lens 120, assembly errors of the rotation member 110-1 and the wiper 140, and the like may affect the amount of overlap. A method of reducing variations in the overlap amount due to the manufacturing errors and assembly errors is employed in an example of the installation structure of the wiper 140.

A slot 112 into which the support 141 of the wiper 140 is inserted is provided within the rotation member 110-1. The slot 112 has a third width W3 greater than the first width W1 of the support 141 of the wiper 140. The third width W3 of the slot 112 is less than the second width W2 of the wiping portion 142 of the wiper 140. The support 141 of the wiper 140 is inserted into the slot 112 in the (−)Y direction, which is the direction opposite the direction of the arrow representing Y, for example. When the support 141 of the wiper 140 is inserted into the slot 112, the pair of elastic hooks 141-1 and 141-2 are contracted and deformed inwardly. In a case where an end portion of the pair of elastic hooks 141-1 and 141-2 is out of the slot 112, the pair of elastic hooks 141-1 and 141-2 are resiliently restored outwardly again and caught in a locking end portion 113 of the slot 112. Since the third width W3 of the slot 112 is less than the second width W2 of the wiping portion 142 of the wiper 140, the wiper 140 is prevented from falling out in the (−)Y direction. Since the pair of elastic hooks 141-1 and 141-2 are caught in the locking end portion 113 of the slot 112, the wiper 140 is prevented from falling out in (+)Y direction (the direction of the arrow representing Y). Since the third width W3 of the slot 112 is greater than the first width W1 of the support 141 of the wiper 140, the wiper 140 may move in the axial direction X within the slot 112.

Given the configuration where the third width W3 of the slot 112 is greater than the first width W1 of the support 141, alignment errors of the wiper 140 and the lens 120 in the axial direction X due to manufacturing errors and/or assembly errors of the wiper 140, the lens 120, the rotation member 110-1, etc. may be corrected. The wiper 140 may be tilted in the axial direction X within the slot 112. In other words, the wiper 140 may rotate about Z direction parallel to the optical surface 121, that is, the light emission surface 121-1 and the light reception surface 121-2. As a result, tilt errors of the wiper 140 and the lens 120 in the axial direction X due to manufacturing errors and/or assembly errors of the wiper 140, the lens 120, the rotation member 110-1, etc. may be corrected.

In a case where the wiper 140 moves or is tilted in the axial direction X, if the pair of elastic hooks 141-1 and 141-2 are contracted and deformed, the wiper 140 may fall out of the slot 112 in the (+)Y direction. To address this issue, the developing device 100 according to the present example may include a separation prevention member. The separation prevention member may limit an amount of contraction of the pair of elastic hooks 141-1 and 141-2 in the axial direction X. According to an example, the separation prevention member may be implemented by a protrusion 115 located between the pair of elastic hooks 141-1 and 141-2 to limit the amount of contraction of the pair of elastic hooks 141-1 and 141-2 in the axial direction X. In an example, the protrusion 115 may be located outside the slot 112. In order to allow movement and tilt of the rotation member 110-1 and the wiper 140 in the axial direction X, a width W5 of the protrusion 115 in the axial direction X may be less than an inner distance W4 of the pair of elastic hooks 141-1 and 141-2 in the axial direction X. The protrusion 115 may serve as a tilt center member configured to provide a tilt center of the wiper 140 in the axial direction X. That is, the wiper 140 may be tilted in the axial direction X with respect to the protrusion 115.

Figure 5:
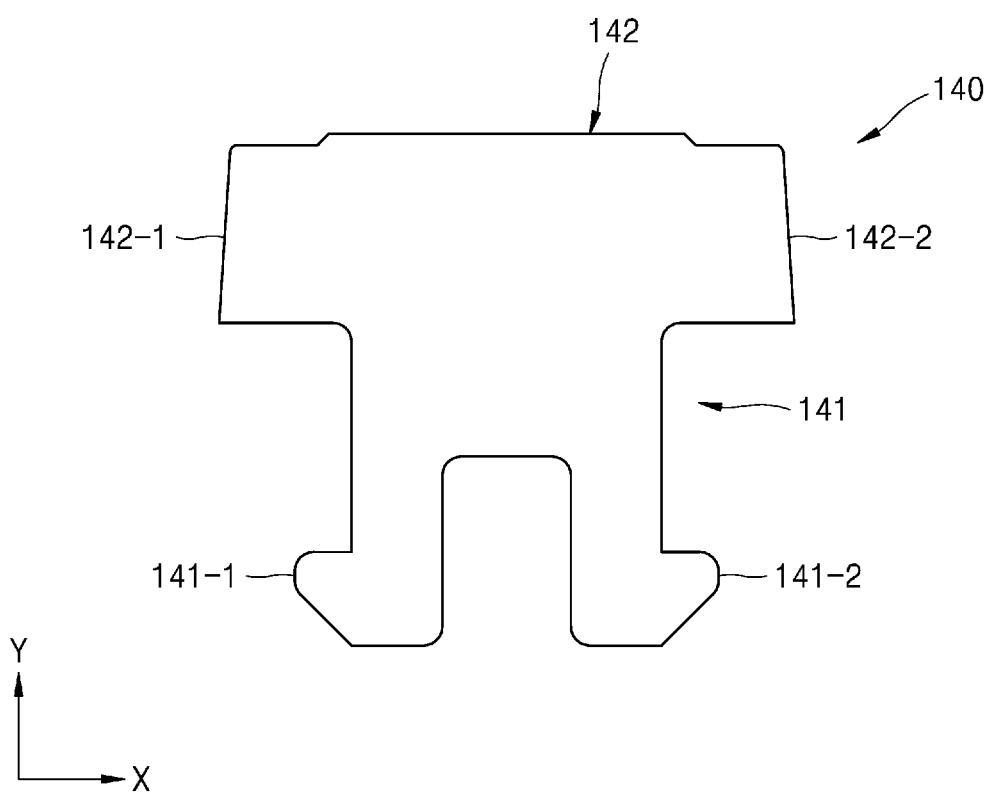
FIG. 5 is a plan view illustrating a wiper, according to an example.
Figure 6:
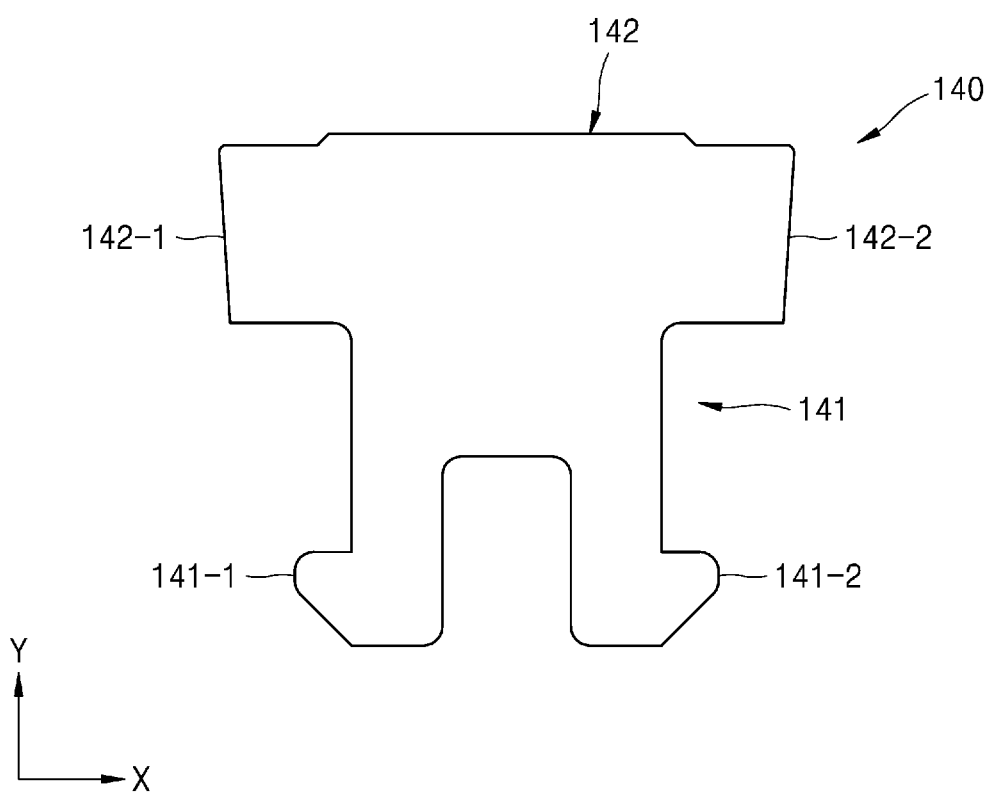
FIG. 6 is a plan view illustrating a wiper, according to another example.

FIGS. 5 and 6 are plan views illustrating examples of the wiper 140. Referring to FIGS. 5 and 6, the first wiping portion 142-1 and the second wiping portion 142-2 may be implemented by an end portion of the wiping portion 142 in the axial direction X. The first wiping portion 142-1 and the second wiping portion 142-2 may have oblique shapes symmetrical to each other. In other words, as illustrated in FIG. 5, the first wiping portion 142-1 and the second wiping portion 142-2 may have shapes in which a distance between them gradually decrease in the (+)Y direction, and as illustrated in FIG. 6, the first wiping portion 142-1 and the second wiping portion 142-2 may have shapes in which the distance between them gradually increase in the (+)Y direction.

In a case where the rotation member 110-1 rotates so that the first wiping portion 142-1 and the second wiping portion 142-2 come into contact with the light emission surface 121-1 and the light reception surface 121-2 and then become separated away from the light emission surface 121-1 and the light reception surface 121-2, if an entire length of the first wiping portion 142-1 and the second wiping portion 142-2 comes into contact with the light emission surface 121-1 and the light reception surface 121-2 and becomes separated away from the light emission surface 121-1 and the light reception surface 121-2 simultaneously, shock noise and vibration may be caused at the time of the contact and the separation. In a case where the wiper 140 according to the present example is employed, if the rotation member 110-1 rotates so that the first wiping portion 142-1 and the second wiping portion 142-2 come into contact with the light emission surface 121-1 and the light reception surface 121-2, a contact length may gradually increase due to the oblique shapes of the first and second wiping portions 142-1 and 142-2. As the first wiping portion 142-1 and the second wiping portion 142-2 are separated away from the light emission surface 121-1 and the light reception surface 121-2 with the rotation of the rotation member 110-1, the contact length may gradually decrease due to the oblique shapes of the first and second wiping portions 142-1 and 142-2. Thus, the first wiping portion 142-1 and the second wiping portion 142-2 may be gently brought into contact with/separated from the light emission surface 121-1 and the light reception surface 121-2, respectively, thereby decreasing the shock noise and vibration.

Figure 7:
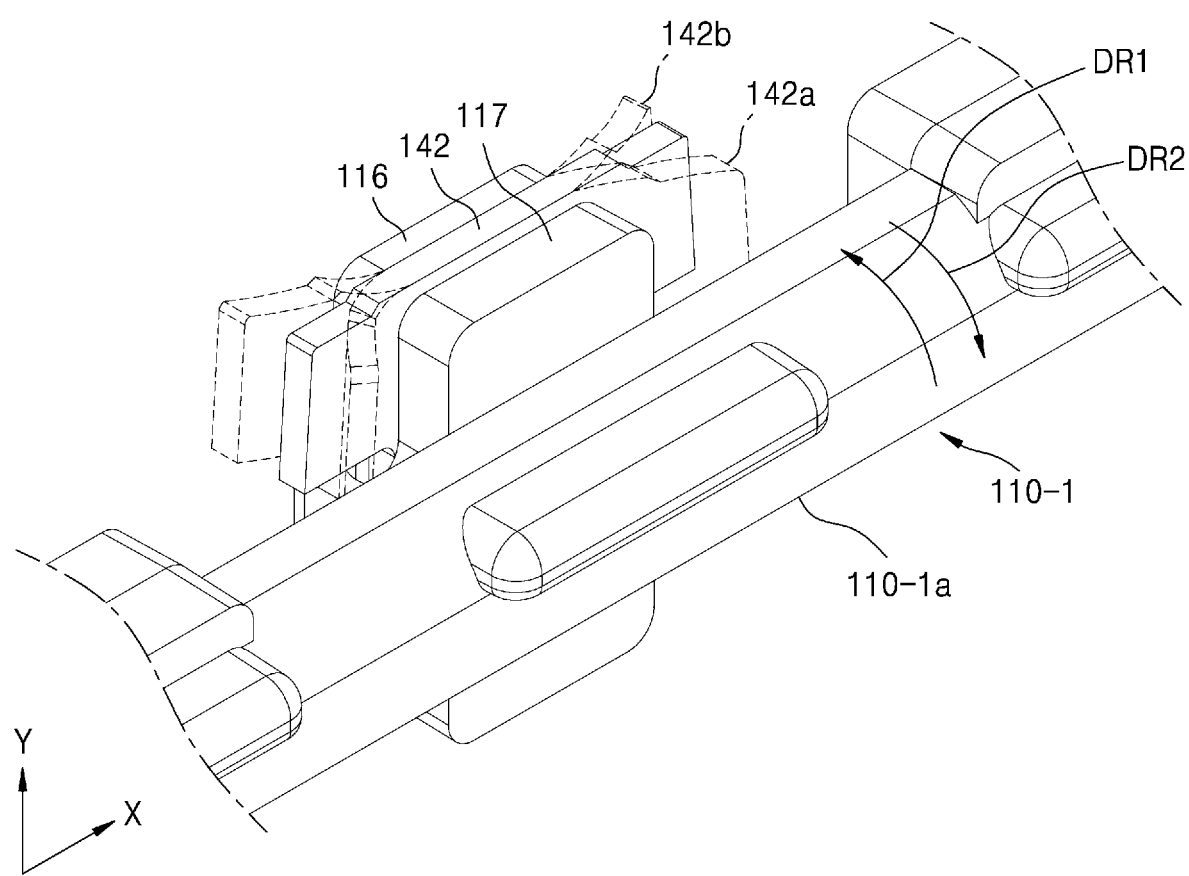
FIG. 7 is a perspective view illustrating a deformed state of a wiping portion according to a rotation direction of a rotation member.

A rotation direction of the rotation member 110-1 may be constant. For example, the rotation member 110-1 may rotate in a forward direction or a reverse direction. FIG. 7 is a perspective view illustrating a state of deformation of the wiping portion 142 in a rotation direction of the rotation member 110-1. Referring to FIG. 7, for example, in a case where the rotation member 110-1 rotates in a forward direction DR1, the wiping portion 142 comes into contact with the light emission surface 121-1 and the light reception surface 121-2, and becomes bent as indicated by reference numeral 142*a*. In a case where the rotation member 110-1 rotates in a reverse direction DR2, the wiping portion 142 comes into contact with the light emission surface 121-1 and the light reception surface 121-2, and becomes bent as indicated by reference numeral 142*b*. In order to obtain the same cleaning effect whether the rotation member 110-1 rotates in the forward direction DR1 or in the reverse direction DR2, a line pressure that acts on the light emission surface 121-1 and the light reception surface 121-2 should be equal. To that end, whether the rotation member 110-1 rotates in the forward direction DR1 or in the reverse direction DR2, free fields of the first and second wiping portions 142-1 and 142-2 should be equal. Referring to FIG. 7, a pair of free field regulators 116 and 117 extending from the slot 112 and covering both sides of the wiping portion 142 in a thickness dimension of the wiping portion 142 are provided within the rotation member 110-1. A length in the Y direction and a width in the X direction of the pair of free field regulators 116 and 117 are the same. Thus, the same cleaning effect may be obtained when the rotation member 110-1 rotates in the forward direction DR1 and when the rotation member 110-1 rotates in the reverse direction DR2.

Figure 8:
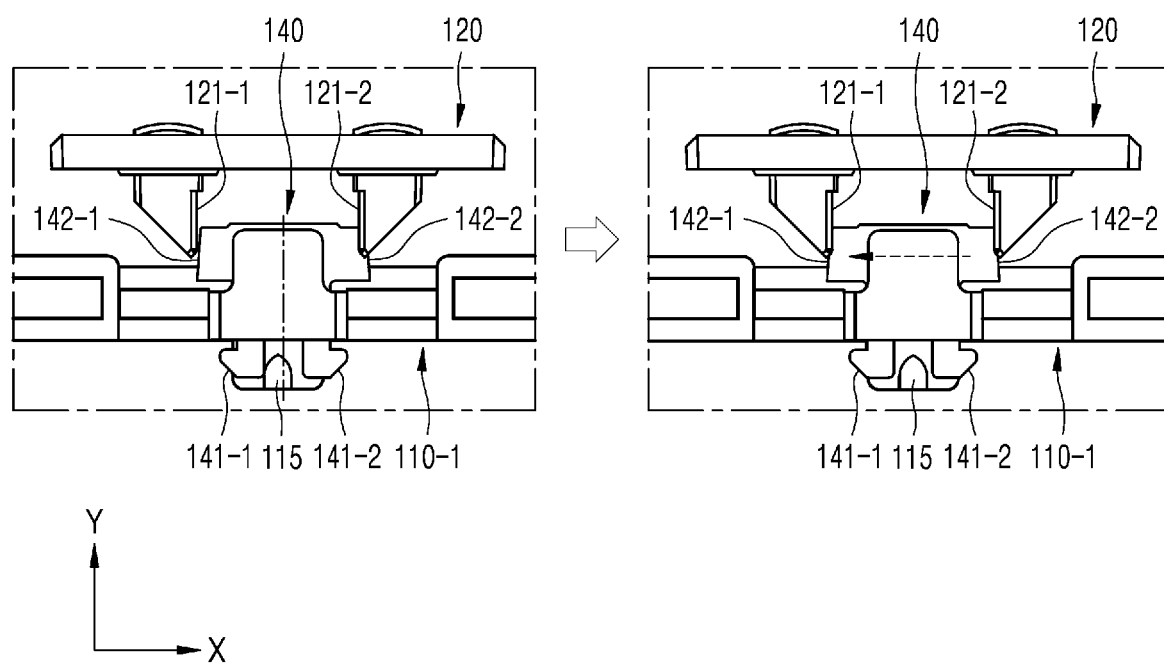
FIG. 8 is a diagram illustrating a process of correcting an alignment error in an axial direction, according to an example.

Processes of correcting an alignment error and a tilt error in the axial direction X are described with reference to FIGS. 8 to 10. FIG. 8 is a diagram illustrating a process of correcting an alignment error in the axial direction X, according to an example. Referring to the left diagram of FIG. 8, since the wiper 140 is deviated in the (+)X direction with respect to the lens 120, an amount of overlap between the light reception surface 121-2 and the second wiping portion 142-2 is greater than an amount of overlap between the light emission surface 121-1 and the first wiping portion 142-1. In this case, the light emission surface 121-1 may not be properly cleaned, and toner may adhere to the light reception surface 121-2 due to an excessive friction on the light reception surface 121-2 or physical properties of the toner may deteriorate. According to the present example, the wiper 140 may move in the X direction. In a case where the rotation member 110-1 rotates and the wiping portion 142 enters into the space between the light emission surface 121-1 and the light reception surface 121-2, the first and second wiping portions 142-1 and 142-2 come into contact with the light emission surface 121-1 and the light reception surface 121-2, respectively, and become resiliently deformed. Since an amount of deformation of the second wiping portion 142-2 having a great overlap amount is greater than an amount of deformation of the first wiping portion 142-1, a reaction force received by the second wiping portion 142-2 from the light reception surface 121-2 in the (−)X direction is greater than a reaction force received by the first wiping portion 142-1 from the light emission surface 121-1 in the (+)X direction. The wiper 140 moves in the (−)X direction (a direction opposite a direction of the arrow representing X in FIG. 8) and is maintained at a position (as shown in the right diagram of FIG. 8) in which the reaction force received by the first wiping portion 142-1 from the light emission surface 121-1 in the (+)X direction and the reaction force received by the second wiping portion 142-2 from the light reception surface 121-2 in the (−)X direction are balanced with each other. In the position shown in the right diagram of FIG. 8, an amount of overlap between the first wiping portion 142-1 and the light emission surface 121-1 and an amount of overlap between the second wiping portion 142-2 and the light reception surface 121-2 are similar to each other. Therefore, the light emission surface 121-1 and the light reception surface 121-2 may be uniformly cleaned, and an excessive friction between the first wiping portion 142-1 and the light emission surface 121-1 or between the second wiping portion 142-2 and the light reception surface 121-2 may be prevented.

Figure 9:
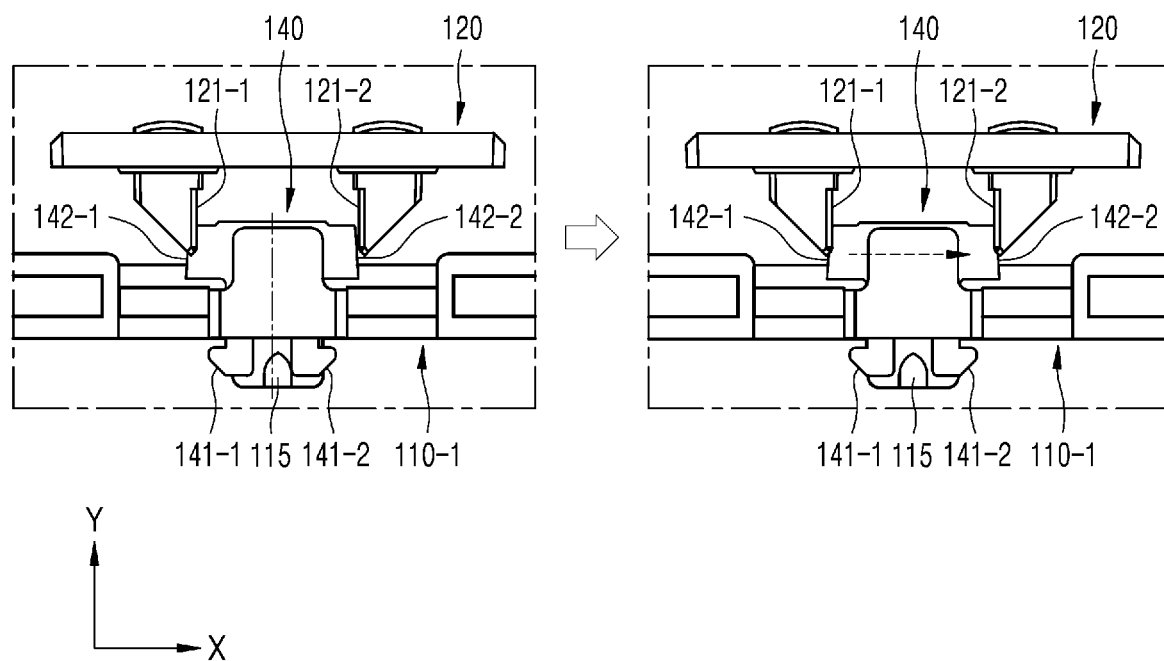
FIG. 9 is a diagram illustrating a process of correcting an alignment error in an axial direction, according to another example.

FIG. 9 is a diagram illustrating a process of correcting an alignment error in the axial direction X, according to an example. Referring to the left diagram of FIG. 9, since the wiper 140 is deviated in the (−)X direction with respect to the lens 120, an amount of overlap between the light emission surface 121-1 and the first wiping portion 142-1 is greater than an amount of overlap between the light reception surface 121-2 and the second wiping portion 142-2. In this state, the light reception surface 121-2 may not be properly cleaned, and toner may adhere to the light emission surface 121-1 due to an excessive friction on the light emission surface 121-1 or physical properties of the toner may deteriorate. According to the present example, when the rotation member 110-1 rotates and the wiping portion 142 enters the space between the light emission surface 121-1 and the light reception surface 121-2, the first and second wiping portions 142-1 and 142-2 come into contact with the light emission surface 121-1 and the light reception surface 121-2, respectively, and become resiliently deformed. Since an amount of deformation of the first wiping portion 142-1 having a great overlap amount is greater than an amount of deformation of the second wiping portion 142-2, a reaction force received by the first wiping portion 142-1 from the light emitting surface 121-1 in the (+)X direction is greater than a reaction force received by the second wiping portion 142-2 from the light reception surface 121-2 in the (−)X direction. The wiper 140 moves in the (+)X direction (the direction of the arrow representing X in FIG. 9), and is maintained at a position (as shown in the right diagram of FIG. 9) in which the reaction force received by the first wiping portion 142-1 from the light emission surface 121-1 in the (+)X direction and the reaction force received by the second wiping portion 142-2 from the light reception surface 121-2 in the (−)X direction are balanced with each other. In the position shown in the right diagram of FIG. 9, an amount of overlap between the first wiping portion 142-1 and the light emission surface 121-1 and an amount of overlap between the second wiping portion 142-2 and the light reception surface 121-2 are similar to each other. Therefore, the light emission surface 121-1 and the light reception surface 121-2 may be uniformly cleaned.

Figure 10:
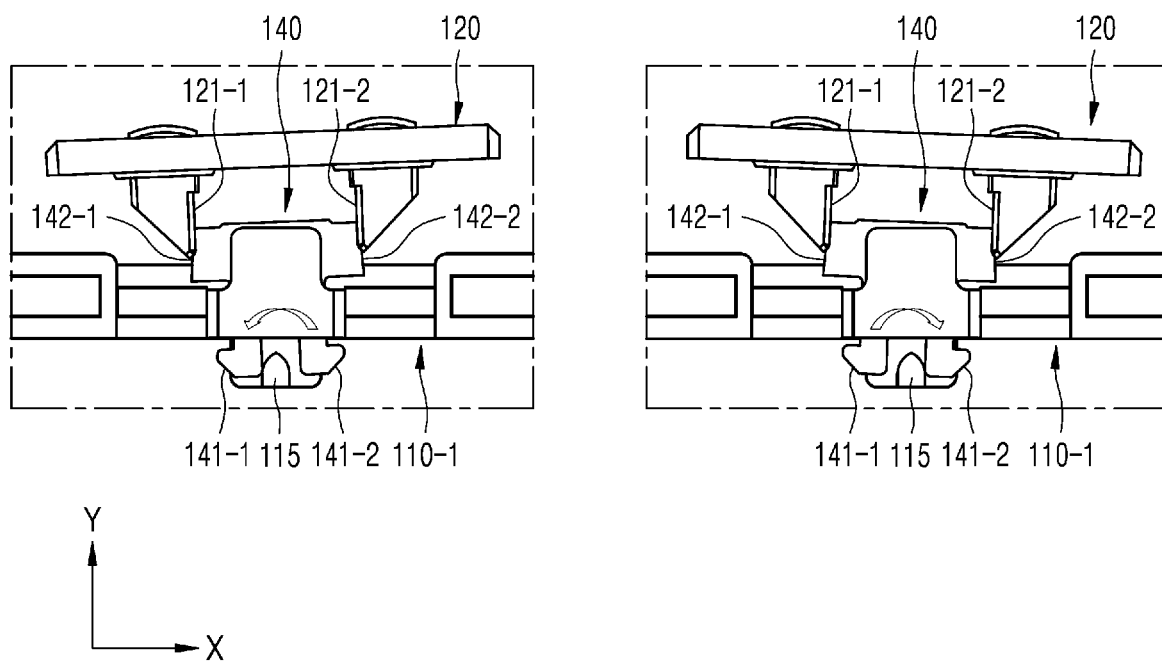
FIG. 10 illustrates a state in which a tilt error in an axial direction is corrected, according to an example.

FIG. 10 illustrates a state in which a tilt error in the axial direction X is corrected. Referring to FIG. 10, the lens 120 may be inclined with respect to the wiper 140 in the (−)X direction (as shown in the left diagram of FIG. 10) or the (+)X direction (as shown in the right diagram of FIG. 10). Such a tilt error may be caused by an assembly error of the lens 120 and the rotation member 110-1. According to the present example, the wiper 140 may be tilted with respect to the rotation member 110-1 in the X direction. In a case where the rotation member 110-1 rotates, and the wiping portion 142 enters the space between the light emission surface 121-1 and the light reception surface 121-2, the first and second wiping portions 142-1 and 142-2 come into contact with the light emission surface 121-1 and the light reception surface 121-2, respectively, and become resiliently deformed. The wiper 140 is tilted in the axial direction X to a position in which reaction forces acting on the first wiping portion 142-1 and the second wiping portion 142-2 are balanced with each other. Therefore, as illustrated in the left and right diagrams of FIG. 10, the wiper 140 is aligned with the lens 120, and the amount of overlap between the first wiping portion 142-1 and the light emission surface 121-1 and the amount of overlap between the second wiping portion 142-2 and the light reception surface 121-2 become similar to each other. As a result, the light emission surface 121-1 and the light reception surface 121-2 may be uniformly cleaned. Tilt of the wiper 140 may be limited because the elastic hooks 141-1 and 141-2 contact an inner wall of the slot 112, but in that case, the elastic hooks 141-1 and 141-2 may be contracted and deformed inwardly. Therefore, the support 141 may fall out of the slot 112. According to the present example, the protrusion 115 may serve as a separation prevention member configured to limit an amount of contraction of the elastic hooks 141-1 and 141-2, and prevent separation of the wiper 140 from the slot 112. In addition, the protrusion 115 may provide a tilt center of the wiper 140. That is, one of the pair of elastic hooks 141-1 and 141-2 may come into contact with the protrusion 115, and the wiper 140 may be tilted in the X direction based on the contact point.

For example, considering manufacturing errors, assembly errors, and the like of the wiper 140, the lens 120, and the rotation member 110-1, the first and second wiping portions 142-1 and 142-2 may be designed to have an amount of overlap of 0.8 millimeters (mm) with the light emission surface 121-1 and the light reception surface 121-2, respectively. In that case, the amount of overlap may be increased to a maximum of 1.6 mm on one side due to the assembly errors and the manufacturing errors. According to the present example, the wiper 140 moves/is tilted in the X direction such that the overlap amount is balanced. Therefore, even if an overlap amount for design is less than 0.8 mm, the optical surface 121 may be cleaned in a stable manner. Accordingly, it is possible to reduce a driving load of the rotation member 110-1.

Figure 11:
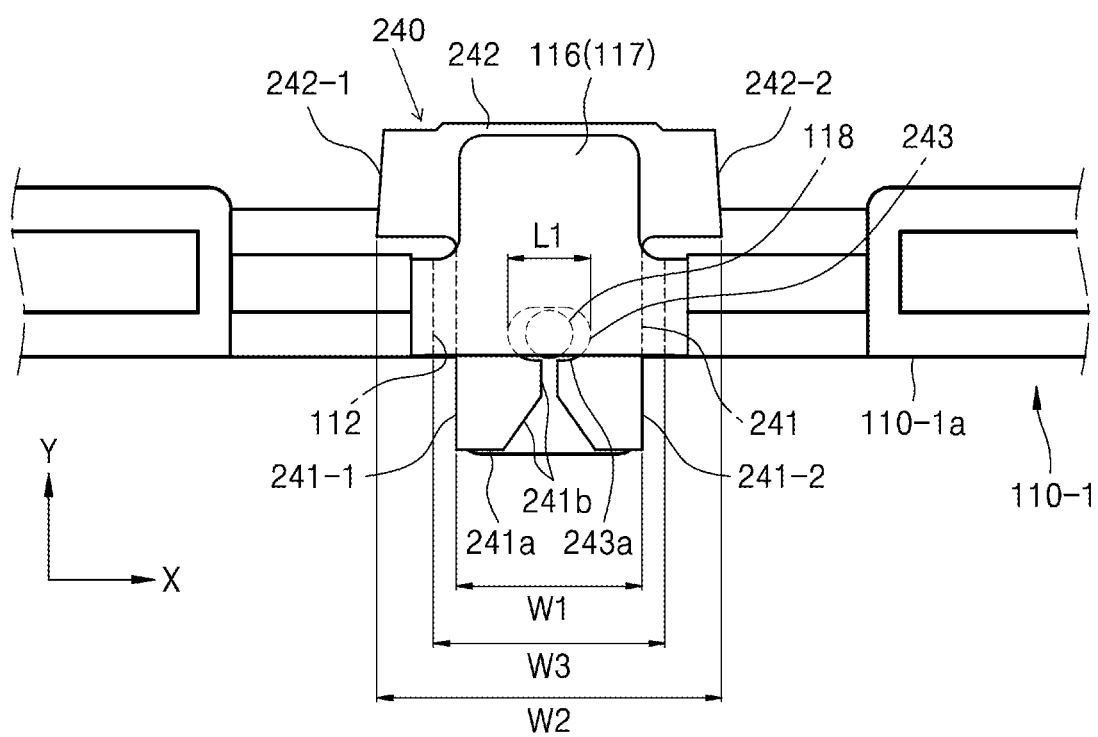
FIG. 11 is a schematic plan view of an installation structure of a wiper, according to an example.

FIG. 11 is a schematic plan view of an installation structure of a wiper 240, according to an example. In the present specification and drawings, constituent elements having substantially the same functions are referenced by the same reference numerals, and thus, redundant descriptions thereof will be omitted. Descriptions given in FIGS. 1 to 10 equally apply to the installation structure shown in FIG. 11 as long as there is no contradiction. Referring to FIG. 11, the wiper 240 may include a support 241 and a wiping portion 242. The support 241 is supported by the rotation member 110-1. The support 241 is provided with an elongated hole 243 having a first length L1 in the axial direction X. The support 241 has a first width W1 in the axial direction X. The wiping portion 242 extends from the support 241 toward the optical surface 121 of the lens 120 in the Y direction orthogonal to the axial direction X. The wiping portion 242 has a second width W2. The wiping portion 242 includes the first and second wiping portions 242-1 and 242-2 configured to wipe the light emission surface 121-1 and the light reception surface 121-2, respectively. The first and second wiping portions 242-1 and 242-2 overlap the light emission surface 121-1 and the light reception surface 121-2, respectively.

The rotation member 110-1 is provided with the slot 112 into which the support 241 of the wiper 240 is inserted. The slot 112 has a third width W3 greater than the first width W1 of the support 241. The third width W3 of the slot 112 is less than the second width W2 of the wiping portion 242. A protrusion 118 inserted into the elongated hole 243 is provided within the slot 112. A length of the protrusion 118 in the axial direction X, for example, a diameter of the protrusion 118, is less than the first length L1.

The support 241 of the wiper 240 is inserted into the slot 112 in the (−)Y direction. As the support 241 is resiliently deformed, the protrusion 118 is inserted into the elongated hole 243. Given this configuration, the wiper 240 is supported by the rotation member 110-1 so as to be movable in the axial direction X in the slot 112. The protrusion 118 may serve as a separation prevention member configured to prevent the wiper 240 from being separated in the (+)Y direction. In addition, the wiper 240 is supported by the rotation member 110-1 so as to be tiltable in the axial direction X in the slot 112. The protrusion 118 may serve as a tilt center member configured to provide a tilt center in a case where the wiper 240 is tilted in the axial direction X.

As an example, the support 241 may be provided with a cut-out groove 241b cut to one side 243a extending in the axial direction X of the elongated hole 243 from an end portion 241a of the support 241 opposite to the wiping portion 242 such that the protrusion 118 is inserted into the elongated hole 243. A pair of elastic hooks 241-1 and 241-2 are formed on the support 241 by the cut-out groove 241b. In a case where the support 241 is inserted into the slot 112, the cut-out groove 241b may have a "V" shape such that the pair of elastic hooks 241-1 and 241-2 are easily opened outwardly by the protrusion 118. Given that configuration, in a case where the support 241 is inserted into the slot 112 and then the protrusion 118 is inserted into the cut-out groove 241b, the pair of elastic hooks 241-1 and 241-2 spread outwardly. Thus, the protrusion 118 may be easily inserted into the elongated hole 243. In a case where the protrusion 118 is inserted into the elongated hole 243, the elastic hooks 241-1 and 241-2 are resiliently restored to their original states and caught in the protrusion 118. Therefore, the wiper 240 does not fall out of the slot 112 in the (+)Y direction.

Figure 12:
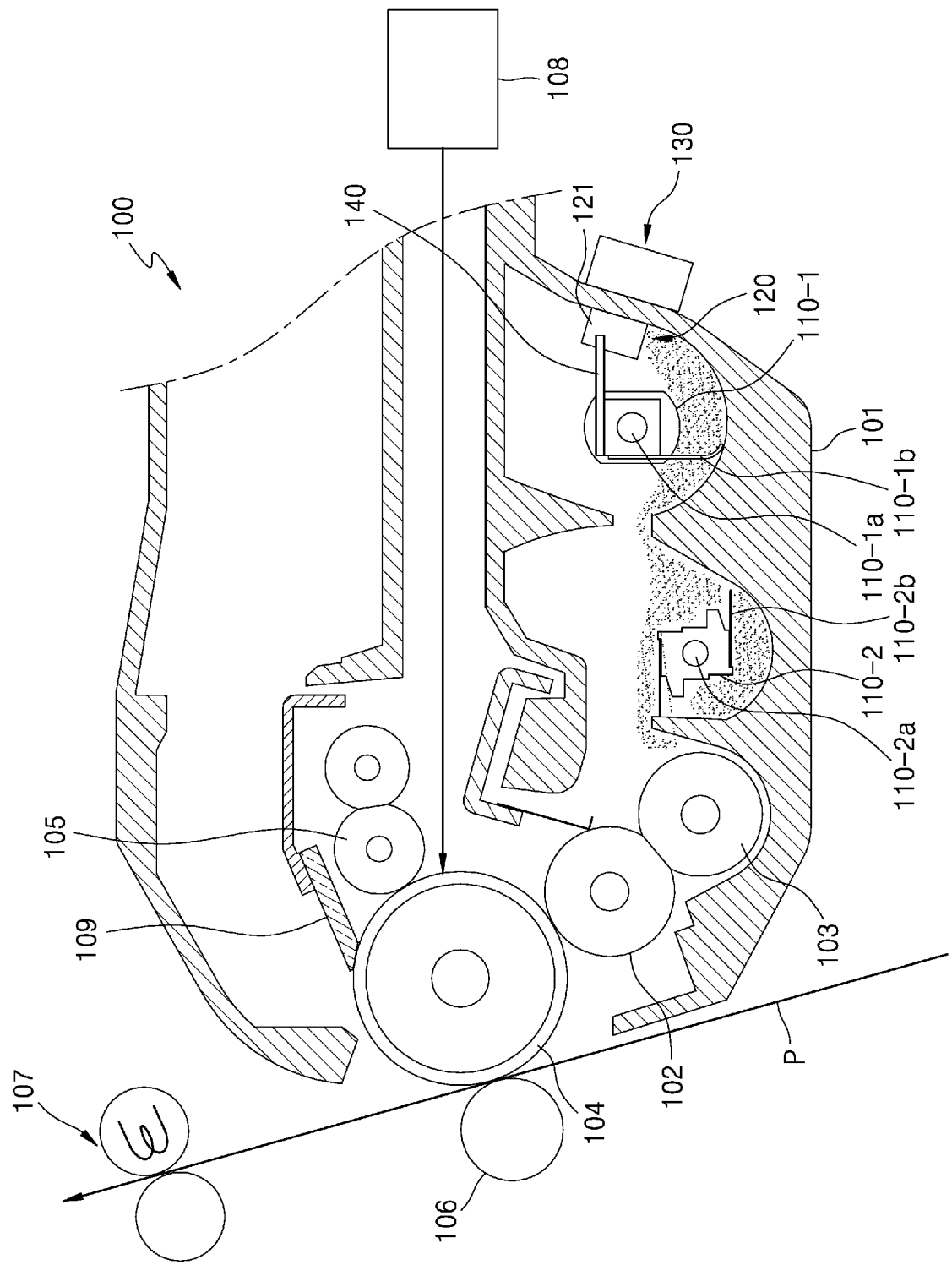
FIG. 12 is a schematic configuration diagram of an image forming device, according to an example.

FIG. 12 is a schematic configuration diagram of an image forming device, according to an example. Referring to FIG. 12, the image forming device may include an exposure device 108, the developing device 100, a transfer device 106, and a fusing device 107. A structure of the developing device 100 is the same as the descriptions given in FIGS. 1 to 11.

A photosensitive drum 104 is an example of a photoconductor on which an electrostatic latent image is formed, and includes a cylindrical metal pipe and a photosensitive layer having photoconductivity and formed on an outer circumference of the cylindrical metal pipe. A charging roller 105 is an example of a charging device configured to charge a surface of the photosensitive drum 104 to a uniform charging electrical potential. The charging roller 105 comes into contact with the photosensitive drum 104 to rotate. A charging bias voltage is applied to the charging roller 105. The exposure device 108 irradiates light corresponding to image information onto a surface of the charged photosensitive drum 104 to form an electrostatic latent image. For the exposure device 108, for example, a laser scanning unit (LSU) configured to scan the photosensitive drum 104 by deflecting light irradiated from a laser diode in a main scanning direction using a polygon mirror may be employed. However, examples of the present disclosure are not limited thereto.

Toner is accommodated in the developing device 100. The developing device 100 supplies toner to the electrostatic latent image formed on the photosensitive drum 104 to form a visible toner image on a surface of the photosensitive drum 104. The transfer device 106 transfers the toner image formed on the photosensitive drum 104 to a printing medium P. For the transfer device 106, a transfer roller facing the photosensitive drum 104 to form a transfer nip may be employed. A transfer bias voltage is applied to the transfer device 106. A transfer electric field is formed between the photosensitive drum 104 and the transfer device 106 by the transfer bias voltage. The toner image developed on the surface of the photosensitive drum 104 is transferred to the printing medium P passing through a transfer nip by the transfer electric-field formed in the transfer nip. A corona transfer device using corona discharge may be employed instead of the transfer roller. After the transfer, toner remaining on the surface of the photosensitive drum 104 is removed by a cleaning member 109. The cleaning member 109 may be implemented by, for example, a blade having one end portion in contact with a surface of the photosensitive drum 104. The toner image transferred to the printing medium P is attached to the printing medium P by an electrostatic force. The fusing device 107 applies heat and pressure to fuse the toner image onto the printing medium P.

The remaining toner level sensor 130 detects a remaining toner level in the housing 101 of the developing device 100. In a case where a detected remaining toner level is less than or equal to a certain value, a controller (not shown) may generate a signal for the developing device 100 to be replaced. As another example, in a case where the detected remaining toner level is less than or equal to the certain value, the controller (not shown) may generate a replenishment signal for the toner in the developing device 100 to be replenished. Toner may be replenished by replacing the developing device 100, supplying toner to the developing device 100, or the like.

It should be understood that examples described herein should be considered in a descriptive sense only and not for purposes of limitation. Descriptions of features or aspects within each example should typically be considered as available for other similar features or aspects in other examples. While one or more examples have been described with reference to the figures, it will be understood by those of ordinary skill in the art that various changes in form and details may be made therein without departing from the spirit and scope as defined by the following claims.

What is claimed is:

1. A developing device comprising:
   a housing to accommodate toner;
   a rotation member installed in the housing;
   a lens having an optical surface facing an axial direction of the rotation member; and
   a wiper installed on the rotation member configured to repeatedly wipe the optical surface while the rotation member rotates, and the wiper is supported by the rotation member so as to be movable in the axial direction.

2. The developing device of claim 1, wherein the wiper is tiltable in the axial direction.

3. The developing device of claim 1, further comprising a developing roller supported by the housing, wherein the rotation member comprises a stirring member configured to supply toner to the developing roller.

4. The developing device of claim 1, wherein the optical surface comprises a light emission surface and a light reception surface arranged apart from each other to face each other in the axial direction, and
   the wiper comprises first and second wiping portions configured to wipe the light emission surface and the light reception surface, respectively.

5. The developing device of claim 4, wherein the first and second wiping portions have oblique shapes symmetrical to each other.

6. The developing device of claim 4, wherein the wiper comprises a support having a first width in the axial direction and comprising a pair of elastic hooks arranged apart from each other in the axial direction, and wherein the first and second wiping portions, extend from the support, and having a second width greater than the first width, and
   the rotation member comprises a slot which has a third width greater than the first width in the axial direction, wherein the support is inserted into the slot, and the slot has a locking end portion to catch the pair of elastic hooks.

7. The developing device of claim 6, wherein the rotation member further comprises a separation prevention member located between the pair of elastic hooks and configured to limit an amount of contraction of the elastic hooks in the axial direction.

8. The developing device of claim 6, wherein the rotation member further comprises a tilt center member configured to provide a tilt center in the axial direction of the wiper.

9. The developing device of claim 8, wherein the tilt center member comprises a protrusion located between the pair of elastic hooks, and a length of the protrusion in the axial direction is less than a distance between the pair of elastic hooks.

10. The developing device of claim 4, wherein the wiper comprises a support having a first width in the axial direction and comprising an elongated hole having a first length in the axial direction, and the first and second wiping portions extending from the support and have a second width greater than the first width, and
    the rotation member further comprises a slot and a protrusion, wherein the slot has a third width greater than the first width in the axial direction, and the support is inserted into the slot, and the protrusion is inserted into the elongated hole and has a length in the axial direction less than the first length.

11. The developing device of claim 10, wherein the support is provided with a cut-out groove cut from an end portion of the support opposite to the first and second wiping portions to one side of the elongated hole in the axial direction such that the protrusion is inserted into the elongated hole.

12. A developing device comprising:
    a housing in which a developing roller is installed;
    a stirring member configured to supply toner accommodated in the housing to the developing roller;
    a remaining toner level sensor comprising a light emission portion and a light reception portion and installed outside the housing;
    a lens comprising a light emission surface and a light reception surface located within the housing to be arranged apart from each other in an axial direction of the stirring member, the lens to guide light emitted from the light emission portion through the light emission surface and the light reception surface and to the light reception portion; and a wiper comprising first and second wiping portions symmetrical to each other with oblique surfaces configured to wipe the light emission surface and the light reception surface, respectively, wherein the wiper is supported by the stirring member so as to be movable and tiltable in the axial direction.

13. The developing device of claim 12, wherein the wiper comprises a support having a first width in the axial direction and comprising a pair of elastic hooks arranged apart from each other in the axial direction, and the first and second wiping portions having a second width greater than the first width, and the stirring member comprises a slot and a tilt limit protrusion, wherein the support is inserted into the slot, the slot has a third width greater than the first width in the axial direction, the slot includes one end portion to catch the pair of elastic hooks, and the tilt limit protrusion is located between the pair of elastic hooks and is configured to limit an amount of deformation of the elastic hooks in the axial direction and provide a tilt center of the wiper in the axial direction.

14. The developing device of claim 12, wherein the wiper comprises a support having a first width in the axial direction and comprising an elongated hole having a first length in the axial direction, and the first and second wiping portions extend from the support and have a second width greater than the first width, and the stirring member comprises a slot and a protrusion, wherein the slot has a third width greater than the first width in the axial direction, the support is inserted into the slot, and the protrusion is inserted into the elongated hole and has a diameter less than the first length.

15. The developing device of claim 14, wherein the support is provided with a cut-out groove cut from an end portion of the support opposite to the first and second wiping portions to one side of the elongated hole in the axial direction such that the protrusion is inserted into the elongated hole.

* * * * *